United States Patent Office 2,765,524
Patented Oct. 9, 1956

2,765,524

METHOD OF MAKING A POROUS ELEMENT

Fritz V. Lenel, North Greenbush, N. Y., and Richard L. Reddy, Amesbury, Mass., assignors to Rensselaer Polytechnic Institute, Troy, N. Y., a corporation No Drawing. Application September 9, 1953,
Serial No. 379,311

5 Claims. (Cl. 29—424)

Our invention relates to a method of making porous metal elements of the type which, in normal use, are subjected to high temperatures and which are cooled by transpiration, and the method of making the same. More particularly, it relates to elements of this character which have a machined surface.

Transpiration is a method of cooling a porous metal element by forcing a cooling medium through its pores in a direction opposite that of the heat flow thereto or therein. The temperature of the cooling medium which may be either liquid or gaseous, increases as it flows through the element towards the surface thereof which may be heated, for example by a stream of hot gases of combustion. It is a very effective method of cooling because a relatively small volume of the cooling medium will maintain the porous metal element at a temperature considerably below that of the gases to which it may be exposed.

Various methods of producing such elements have been proposed, as for example, by powder metallurgy. The metal powder or powders may be compacted at relatively high pressures in a die, ejected from the die, and the compact thereafter sintered. Instead of pressing the powders in dies, they may be mixed with a plasticizer, extruded or fabricated by methods similar to the injection molding of plastics and thereafter sintered. The powders may also be placed in a suitable die and sintered while confined therein. Other methods, such as depositing the metal from a spray gun or fabricating the elements from a wire mesh screen, have been suggested.

It is often necessary to produce porous metal elements having such shapes that they cannot be readily fabricated to finished form and size by any of the aforesaid methods. In such a case, it is necessary to give the elements their final shape by machining. However, in machining, the cutting tool smears the surface which is cut, causes the walls of the pores in a machined surface to close or collapse so that the permeability of the element is substantially reduced. The extent to which the permeability will be reduced depends upon the design and sharpness of the cutting tool but, even under optimum machining conditions, the permeability will be appreciably lower. This means that the element will no longer be cooled efficiently and will be readily overheated.

It is the principal object of this invention to provide a means and method by which the surface of a porous metal element may be machined without impairing its permeability.

A number of methods has heretofore been suggested for accomplishing this end but none of them has been successful. For example, it has been suggested to etch the surface of a porous element with a strong acid after it has been machined but, it is obvious that such a procedure would have to be extremely well controlled so that on the one hand, all smeared metal is removed and, on the other hand, the etchant does not corrode the interior of the porous element. It has also been suggested to fill the pores of the element with a plastic compound or a salt, such as a heat treating salt, in the hope of reinforcing the porous structure and thereby preventing smearing during the machining. Neither of these last mentioned methods has been successful since neither plastic compounds nor salts embody the necessary strength and ductility. Such materials are weak and brittle and, under the action of the cutting tools, chip off and fail to give the support to the porous metal structure which is necessary to keep it from being deformed by the cutting tool and, therefore, from being smeared over the entrances to the pores. Furthermore, it is practically impossible completely to remove the impregnating plastic or salt without leaving an injurious residue in the metal structure. Where the impregnating material is a plastic which is removed by heating the porous element after machining, a residue of carbon is left which, when combined with any ferrous metal or alloy, renders it brittle. If the impregnant is a salt, it might be partially removed by repeated leaching with water or an aqueous solution, but it is impossible completely to remove a salt from a porous metal element in this manner, and any residue has a highly corrosive action particularly at elevated temperatures.

We have discovered that a porous element formed of metal or an alloy thereof whose pores have been filled with another metal, can be machined without any danger of smearing the pores of the porous element. The metal impregnant fills the pores of the porous element, at least in and adjacent the surface thereof which is to be machined, and will not be chipped out or otherwise removed by the action of the cutting tool. After the element has been machined, the impregnant metal may be completely removed and the original permeability of the element thereby restored.

In order to serve successfully as such an impregnant, the metal or alloy employed must have the following properties:

(1) A relative interfacial tension with respect to the metal or alloy from which the porous element is formed so that it will readily enter the pores of said element.

(2) Sufficient inertness, when in the fluid (liquid or gaseous) state, with respect to the metal or alloy from which the porous element is formed so that any attack upon the structure of the porous element will not weaken it or reduce its porosity.

(3) A sufficiently high vapor pressure so that it may be removed from the porous element by distillation at a temperature below that at which the structure of said element will be affected.

Assuming that it is desired to fabricate a porous turbine blade from a type AISI316 austenitic stainless steel, the stainless steel powder is screened to a size which, after being pressed and sintered, will form a blank having the desired permeability measured as a permeability coefficient in square inches in an apparatus for measuring permeability. The powder is then pressed in a die into the blank; the blank is ejected from the die; sintered for three hours at 2300° F., in an atmosphere of dry hydrogen, and cooled in this atmosphere. The sintered blank is then impregnated with liquid lead by placing it in a suitable container so constructed that the blank cannot float upon the lead when molten but will remain completely submerged therein. A quantity of liquid lead, sufficient to cover the blank completely, is introduced into the container and then heated in an atmosphere of dry hydrogen to a temperature preferably of the order of about 1950° F., for around 90 minutes, cooled in this atmosphere to a temperature just above the melting point of the lead, and then removed from the container. The impregnated blank is now machined into the desired shape of the turbine blade, and the lead is then removed from the machined blade by distillation. The blade is placed in a vacuum furnace having a residual gas pressure of not more than about 1 mm. of mercury and which is provided with a small leak in communication with a source of nonoxidizing gas, such as hydrogen, at low pressure. The blank is heated in this furnace to a temperature of the order of 1950° F., for three hours, during which time all of the lead in the blank distills off. The blank is then cooled to room temperature in the vacuum and is ready for use.

Instead of using lead as an impregnant, bismuth, or an alloy of lead and bismuth, preferably a eutectic alloy thereof, or an alloy of lead with a small percentage of silver, say around 0.3%, or at least under 1%, may be used. The silver addition to the lead functions as a "wetting agent" and facilitates the penetration of the lead into the steel. Other agents, such as small quantities of calcium, sodium or zinc may be used, but silver is preferred.

Table I shows the permeability of untreated, porous, stainless steel disks as sintered, and permeability of the same disks after they have been impregnated with an alloy of lead and silver. Both flat faces of the disks were machined and the lead was removed by vacuum distillation as described above. These data demonstrate that an alloy of lead and silver is effective in preserving more than 75% of the original permeability in disks varying in permeability from more than 17 to less than $2 \times 10^{-10}$ sq. in.

TABLE I

*The effects of machining upon the permeability coefficients of porous impregnated stainless steel compacts*

| Mesh Fraction | Compacting Pressure, t. s. i. | As-Sintered Permeability Coefficient × $10^{10}$ in.$^2$ | Post-Treatment Permeability Coefficient × $10^{10}$ in.$^2$ | Ratio of Final to Initial Permeability | Percent Porosity |
|---|---|---|---|---|---|
| −100 +150 | 20 | 17.22 | 16.60 | .965 | 33.0 |
| −150 +200 | 20 | 12.28 | 10.30 | .84 | 33.4 |
| −200 +270 | 20 | 9.28 | 7.80 | .84 | 33.4 |
| −270 +325 | 20 | 8.03 | 6.43 | .80 | 34.2 |
| −100 +150 | 25 | 12.05 | 9.64 | .80 | 29.5 |
| −150 +200 | 25 | 8.10 | 6.48 | .80 | 30.1 |
| −200 +270 | 25 | 6.86 | 5.18 | .755 | 30.4 |
| −270 +325 | 25 | 5.79 | 4.38 | .76 | 31.4 |
| −100 +150 | 40 | 4.21 | 3.61 | .86 | 22.4 |
| −150 +200 | 40 | 2.54 | 2.26 | .89 | 22.2 |
| −200 +270 | 40 | 2.39 | 1.97 | .825 | 22.4 |
| −270 +325 | 40 | 1.87 | 1.52 | .815 | 22.6 |

All specimens impregnated with 0.3% Ag-Pb alloy at 2000° F. for 90 minutes.
All specimens machined on lathe.

It is to be understood that neither the impregnant nor the temperature of impregnation is particularly critical. However, it is impossible to impregnate stainless steel with lead just above its melting point because of the interfacial tension of the lead and the steel. As the temperature of the molten lead is raised, its fluidity is increased until a temperature is reached at which it can penetrate into the small capillaries of the steel. It is also possible to aid the impregnation by lowering the pressure above the molten lead in which the stainless steel is submerged. To obtain complete impregnation temperatures above 1500° F. are necessary.

The distillation temperature is not particularly critical but it must be high enough so that the vapor pressure of the impregnant metal is of the order of the vacuum in the vacuum chamber. How low a vacuum pressure, and therefore a temperature, can be used is largely governed by the desired rate of removal of the impregnating metal. At low pressures and low temperatures, the rates become uneconomically slow.

While we have described our invention in its preferred embodiment, it is to be understood that the words which we have used are words of description rather than of limitation and that changes, within the purview of the appended claims, may be made without departing from the true scope and spirit of our invention in its broader aspects.

What we claim is:

1. That step in the method of forming a porous metal element having a machined surface and which, in use, is subjected to high temperatures and cooled by transpiration which comprises preventing the collapse, during the machining of said surface, of those pores in said element which are in and adjacent said surface before the machining thereof by filling them with metal selected from the group consisting of lead, bismuth, an alloy of lead and bismuth, and an alloy of lead and less than 1% of silver.

2. That step in the method of forming a porous metal element having a machined surface and which, in use, is subjected to high temperatures and cooled by transpiration which comprises preventing the collapse, during the machining of said surface of those pores in said element which are in and adjacent said surface before the machining thereof by filling them with an alloy of lead and less than 1% of silver.

3. That step in the method of forming a porous metal element having a machined surface and which, in use, is subjected to high temperatures and cooled by transpiration which comprises preventing the collapse, during the machining of said surface, of those pores in said element which are in and adjacent said surface before the machining thereof by filling them with a eutectic alloy of lead and bismuth.

4. That step in the method of forming a porous metal element having a machined surface and which, in use, is subjected to high temperatures and cooled by transpiration which comprises preventing the collapse, during the machining of said surface, of those pores in said element which are in and adjacent said surface before the machining thereof by filling them with an alloy of lead and bismuth.

5. A method of forming a porous element having a machined surface and which, in use, is subjected to high temperatures and cooled by transpiration; said method comprising first forming a porous body from a powdered metal having high resistance to corrosion at elevated temperatures by pressing said powdered metal into a mass of appropriate size to form said element; sintering said mass in a non-oxidizing atmosphere; impregnating at least those pores of the body so formed which are in and adjacent the surface to be machined by immersion in a molten metal of the group consisting of lead, bismuth, an alloy of lead and bismuth, and an alloy of lead and less than 1% of silver; machining the impregnated body to the desired form; and thereafter removing the impregnating metal by distillation in a vacuum.

References Cited in the file of this patent

UNITED STATES PATENTS

| | | |
|---|---|---|
| 2,447,980 | Hensel | Aug. 24, 1948 |
| 2,462,045 | Wulff | Feb. 15, 1949 |
| 2,663,928 | Wheeler, Jr. | Dec. 29, 1953 |
| 2,669,008 | Levi | Feb. 16, 1954 |